F. V. PHILLIPS.
SHOCK ABSORBER.
APPLICATION FILED MAR. 10, 1914.

1,134,224.

Patented Apr. 6, 1915.

Attest:
Paul Finckel

Inventor
Francis V. Phillips,
By Howell Bartle
Attorney.

UNITED STATES PATENT OFFICE.

FRANCIS V. PHILLIPS, OF ORLANDO, FLORIDA.

SHOCK-ABSORBER.

1,134,224.

Specification of Letters Patent.

Patented Apr. 6, 1915.

Application filed March 10, 1914. Serial No. 323,695.

*To all whom it may concern:*

Be it known that I, FRANCIS V. PHILLIPS, a citizen of the United States, residing at Orlando, in the county of Orange and State of Florida, have invented new and useful Improvements in Shock-Absorbers, of which the following is a specification.

My invention relates to shock absorbers for use on automobiles or other vehicles, its main object being to provide an efficient device of simple construction which may be readily applied to the vehicle, and which will absorb shocks incident to compressions and reactions of the vehicle springs.

Another object of the invention is to provide means whereby the device may be readily adjusted to suit the particular vehicle to which it is applied.

With these objects in view, my invention consists in the features hereinafter described and particularly pointed out in the appended claims.

Figure 1:
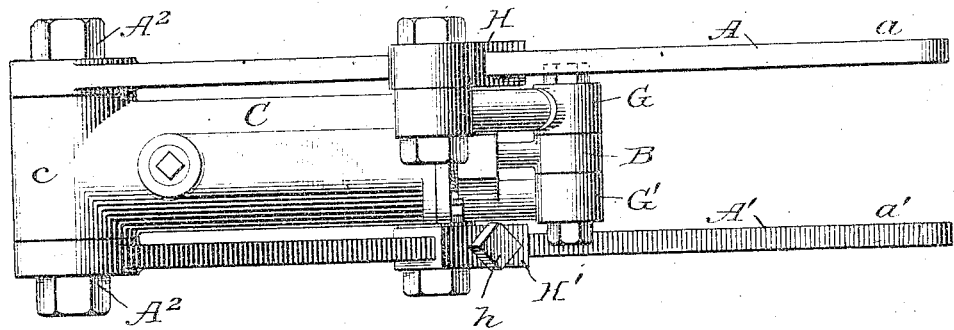
Figure 2:
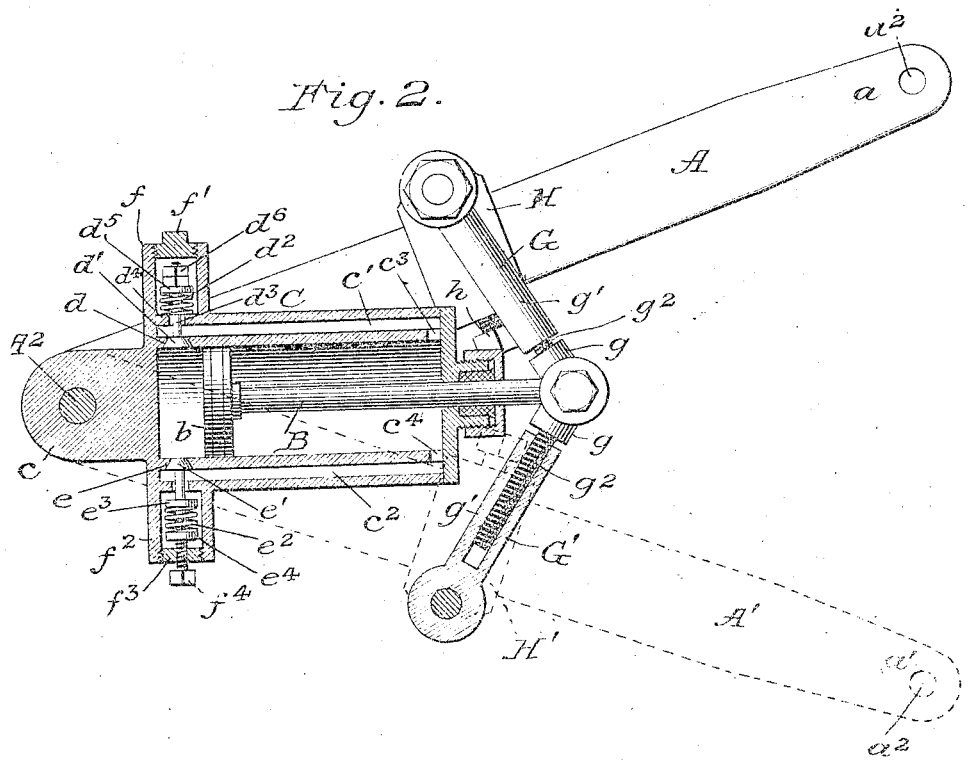

Referring to the drawings forming a part of this specification, Figure 1 is a top or plan view of a shock absorber embodying my invention, and Fig. 2 is a partial longitudinal vertical section thereof.

A and A' indicate a pair of arms which are pivotally connected together at $A^2$, the free ends $a$ and $a'$ of said arms being provided with apertures $a^2$, by means of which one of said arms may be secured in any suitable manner to the body of a vehicle, and the other to some convenient part of the vehicle running gear; or the device may be applied to the vehicle springs in any manner best suited to resist or retard violent recoils thereof; and as will be hereinafter explained, said device may, if desired, be adjusted to also resist compressions of the springs.

It will be understood that when properly mounted, the free ends of the arms A and A' will be moved toward and from each other by movements of the vehicle body due to compression and expansion of the vehicle springs, and to resist relative movement of said arms, I have provided a device which is carried by the pivotal connection $A^2$, said device comprising a reciprocating member B and means for resisting movement thereof. The particular means for resisting movement of the member B is immaterial to the broad idea of mounting the movement resisting means on the pivotal connection of the arms A and A'. As illustrated in the drawings, I have provided the member B with a piston $b$ which operates in a cylinder C, said cylinder being provided at its rear end with a perforated lug or boss $c$ through which passes the bolt $A^2$ that pivotally connects the arms A and A', said arms being at each side of the cylinder C, as clearly shown. Longitudinal passages $c'$ and $c^2$ are provided in opposite walls of the cylinder C, said passages being in free communication with one end of the cylinder through ports $c^3$ and $c^4$, and communicating with the opposite end of the cylinder through valved ports $d$ and $e$. The port $d$ is normally closed by a valve $d'$ which opens inwardly but which is held to its seat by a spiral spring $d^2$ mounted on the valve-stem $d^3$ and operating between a ledge $d^4$ surrounding the valve-stem and a washer $d^5$ adjustably mounted on the valve-stem by means of nuts $d^6$, the latter being screw threaded on the valve-stem, as will be readily understood. The valve-stem, spring and adjusting nuts, are housed in a hollow extension $f$ of the cylinder C which is provided with a removable cap or plug $f'$, so that access may be had to the valve adjusting means, for purposes hereinafter described.

The port $e$ is controlled by a valve $e'$ opening outwardly and which is normally held to its seat by a spring $e^2$ pressing against the headed valve-stem $e^3$. The valve-stem and spring is inclosed in a hollow extension $f^2$ of the cylinder C, said extension being provided with a removable cap or plug $f^3$. The tension of the spring $e^2$ is regulated by means of a screw $f^4$ tapped through the plug $f^3$ and bearing against a disk $e^4$, which in turn bears against the outer end of the spring.

The reciprocating member B has its outer end pivotally connected to two links G and G', the link G having its outer end pivotally connected to a sleeve H adjustably mounted on the arm A, and the link G' having its outer end similarly connected to a sleeve H' adjustably mounted on the arm A'. The sleeves H and H' are slidable on the arms A and A', and are locked in any desired position thereon by set screws $h$. The links G and G' are each rendered adjustable as to length by constructing them in two parts $g$ and $g'$, the part $g$ being provided with a screw-threaded stem $g^2$ fitting into an interiorly threaded socket in the part $g'$.

The longitudinal adjustment of the links

G and G', and the adjustment of their pivotal connection with the arms A and A', are provided to enable the reciprocating member B to be properly adjusted with reference to the cylinder C, at any desired normal position of the arms A and A'. In other words, the desired normal angle of the arms A and A' may be increased or diminished to suit particular requirements, by adjusting the connections with the reciprocating member B, so that the latter may be properly positioned with respect to the cylinder C or other movement resisting element.

The cylinder C is designed to be filled with glycerin or other liquid, or with air only, and it will be understood that when the device is properly mounted, as hereinbefore described, compression of the vehicle springs will cause the outer ends of the arms A and A' to move toward each other. The reciprocating member B will be thereby drawn outwardly from the cylinder C by the links G and G' acting as a toggle lever. The liquid or fluid in the forward end of the cylinder C will be forced by the piston $b$ through port $e^3$ and passage $c'$ to the other side of the piston through the port $d$, the passage of the liquid through said port being more or less retarded by the valve $d'$, according to the adjustment of its spring $d^2$. On the rebound or recoil of the vehicle spring, the arms A and A' will be moved apart, and resistance to this movement will be offered by the fluid at the rear of the piston, which will be slowly forced by the piston through the port $e$, passage $c^2$ and port $c^4$ to the front of the cylinder. The passage of the fluid through port $e$ will be resisted by the pressure of spring $e^2$ on the valve $e'$, which, as will be readily understood may be adjusted to suit requirements.

When the device is initially mounted on a vehicle, the links G and G' are disconnected from the reciprocating member B, and their length and connections with the arms A and A' adjusted to properly position the piston $b$ in the cylinder C with respect to the normal angular position of said arms, said links being thereafter connected to the member B, as will be readily understood.

Having thus described my invention, what I claim as new and desire to secure by Letters Patent is,

1. In a shock absorber, the combination of a pair of pivotally connected arms, a pivot support adjustably mounted on each of said arms, a movement retarding device supported by said arms at their pivotal connection, said device including a reciprocating member and means for resisting movement thereof, and a pair of links pivotally connected at one end to said reciprocating member, each of said links being pivotally connected at its other end to one of said pivot supports.

2. In a shock absorber, the combination of a pair of pivotally connected arms, a movement retarding device supported by said arms at their pivotal connection, said device including a reciprocating member and means for resisting movement thereof, and a pair of links pivotally connected at one end to said reciprocatory member, each of said links being pivotally connected at its other end to one of said arms, and each being composed of two parts adjustably secured together for varying the length of the link, for the purpose described.

In testimony whereof I have hereunto set my hand in presence of two subscribing witnesses.

FRANCIS V. PHILLIPS.

Witnesses:
C. P. DICKINSON,
ETHEL BARLOW.